May 15, 1951 B. M. HADFIELD 2,552,780

TWO-WAY LOOP AND EARTH CURRENT SIGNALING SYSTEM

Filed Jan. 26, 1946 2 Sheets-Sheet 1

INVENTOR
BERTRAM MORTON HADFIELD

BY Chas. Lu. Candy

ATTORNEY

TWO-WAY LOOP AND EARTH CURRENT SIGNALING SYSTEM

Filed Jan. 26, 1946 2 Sheets-Sheet 2

INVENTOR
BERTRAM MORTON HADFIELD

BY [signature]

ATTORNEY

Patented May 15, 1951 2,552,780

UNITED STATES PATENT OFFICE 2,552,780

TWO-WAY LOOP AND EARTH CURRENT SIGNALING SYSTEM

Bertram Morton Hadfield, Harrow Weald, England, assignor to Automatic Electric Laboratories Inc., Chicago, Ill., a corporation of Delaware Application January 26, 1946, Serial No. 643,702
In Great Britain January 30, 1945

10 Claims. (Cl. 179—16)

The present invention relates in general to electrical signalling systems, but is more particularly concerned with electrical signalling systems of the type that may be used with automatic telephone systems, wherein direct current signals are employed for control and supervisory purposes.

An object of the present invention is to provide a circuit wherein two or more signals may be transmitted independently and concurrently without causing any signal circuit change other than changes necessary to transmit such signals.

Another object of the present invention is to provide a system whereby the signal response is less distorted, faster, and unaffected by interfering currents produced in the transmission medium by external source or by transitory oscillatory current modes.

A feature of the present invention is the use of double and single current signals of permanent character and of symmetrical wavefronts.

Another object of the present invention is to provide an electrical signalling system having facilities for direct current signalling in either direction over a two-conductor line. All of the signals in one direction of transmission are effective at the incoming end of the line for receiving equipment responsive only to the sum of the line currents and all signals in the other direction of transmission are effective at the incoming end of the line for receiving equipment responsive only to the difference of the line currents.

Another feature of the present invention is the use of the loop current signals in one direction of transmission and the use of earth current signals for the other direction of transmission. Receiving equipment is disposed symmetrically between the line wires and connected in such a manner as to respond only to the type of signal for which it is intended.

Another feature of the invention is the use of two sets of transmitting equipment, one of which produces line current changes of equal magnitude, but of opposite polarity in the line wires, and the other of which produces line current of changes of equal magnitude, but of the same polarity. Two sets of receiving equipment are provided, each of which is adapted to respond to one type of current change.

The various objects and features of the present invention will be understood best from a perusal of the following detail description of the drawings comprising Figs. 1–5, inclusive, which show by means of the usual circuit diagrams a sufficient amount of apparatus to enable the invention to be described and understood.

Figure 1:
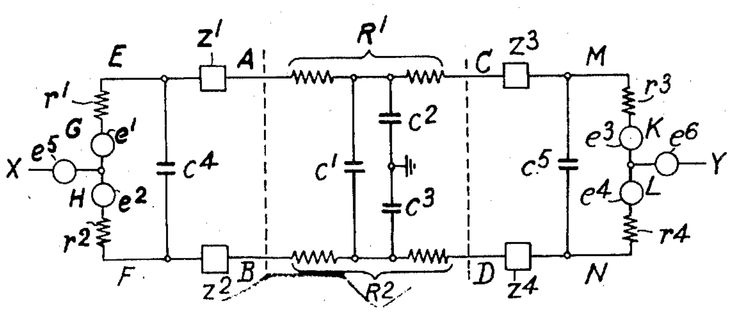
Fig. 1 is a schematic diagram of the equivalent electrical circuit of a typical transmission system.

A typical schematic diagram of the equivalent electrical circuit of the transmission system of the present invention is shown in Fig. 1. The transmission medium is shown between the dotted lines in the form of an equivalent circuit and consists of two line conductors AC and BD whose series impedances are represented as resistances R1, R2, and whose shunt impedances are represented as capacities to earth, C2 and C3, and whose line-to-line capacity is represented as C1. These qualities are, of course, distributed uniformly per unit length, but the grouping shown forms a convenient approximation. Series impedances Z1, Z2, Z3 and Z4 are used to represent terminal speed transmission equipment if taken together with the capacities C4, C5 and may, for instance, be repeating transmission bridge transformer windings. Series resistance $r1$, $r2$, $r3$ and $r4$ represents the internal impedances of the signalling apparatus. Series sources of signal current $e1$, $e2$, $e3$ and $e4$ complete the line wire loop. Shunt sources of signal current $e5$, $e6$ complete the earth circuit via points X and Y. Since the lines and terminal speed equipment are normally balanced with respect to earth, it follows that the signalling apparatus should also be balanced, and this has been shown where X and Y are considered to be connected to the earth and assuming $r1=r2$, $r3=r4$, Z1=Z2, Z3=Z4, C2=C3, R1=R2 and further assuming that the signal current sources possess no impedance.

To best understand the operation of the present invention, a theoretical analysis will be given, at the outset, in reference to the equivalent circuit shown as Fig. 1. According to the invention, it is desired to generate pure loop signalling currents and pure earth currents; to distinguish between them at the reception apparatus. Since the circuit is balanced with respect to earth, it is clear that any series earth potential, such as $e5$ or $e6$ will produce line currents of equal magnitude and flowing in the same direction. Any changes in $e5$ or $e6$, or a disconnection between X and Y, will change the magnitude of the line current, but will not change the equality. Further, any unbalance between C1 and C2, or between C3 and C4 is equivalent to the insertion of one half the difference in leads X and Y, respectively, and therefore produce similar effects. Hence, the conditions for pure earth signalling are established.

The circuit also partakes of the form of a Wheatstone bridge, in which XY represent one diagonal and any points such as AB, CD, EF or GH in turn represent the other diagonal. Thus any circuit change across these latter points such as a short, a battery, or a resistance, or any combination thereof, cannot affect the potential between the points X and Y, and cannot affect the current flowing between X and Y, although it may affect the distribution between the line conductors. Hence, the conditions for pure loop signalling are established.

In regards to discrimination between the two forms of signal, it is clear that the algebraic sum of the voltage on any two equal series lines such as $r1$, $r2$ or $r3$, $r4$ is zero for earth currents, but finite for loop currents, and it follows that the algebraic differences are respectively finite and zero. Similarly, if a relay having two windings of equal turns and resistance is connected with one winding in one line and the other winding in the other line, then by making the windings series aiding in a loop sense, response only to the loop current is ensured. On the other hand, by making the connections series opposing in the loop sense, response only to the earth current is ensured. Hence, the conditions are established for pure loop current operation and pure earth current operation.

It is clear that if the above conditions are established practically, then signalling of either form may be carried out without mutual interference, and thus lead to considerable simplification in the interpretation of such signals.

In the present discussion it will be noted that different relay sets are connected to the terminating points. For purposes of simplicity, a loop current transmitter may be provided at the calling end and a relay set responsive to loop current signals may be provided at the opposite end. At the called end, an earth current transmitter may be provided and a relay set responsive to earth current signals may be provided at the opposite end.

The present invention also discloses two further types of signals to be used with the system to be described herein, namely, a reversal of current and cessation of current. The former signal is immune from interference by unwanted signal voltages provided the unwanted signal current does not reach the true signal current magnitude. Since a true signal of one polarity or another is always present, it follows that the immunity from interference is best when the attenuation in the line is at a minimum. The type of true signal just described is known as double current, if the reversal attains substantially the same magnitude. The cessation of current signal is known as single current. Its immunity from interference is based upon the same factors as the double current signal. However, since the interference current acts as a bias to the responding equipment, the single current signal is not effective unless it can be generated in such a manner as to overcome the magnitude of the interference current.

Figure 2:
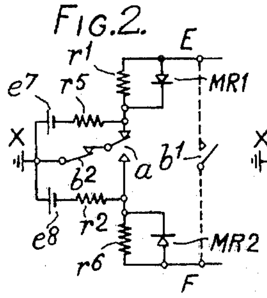
Figs. 2 and 3 show various embodiments of the loop current transmitting equipment.

Referring now to Fig. 2 which shows a method of obtaining reversals of loop current in a system which does not require twice the normal battery voltage to produce the normal loop current. It is assumed at this point, that there is no other loop battery than the one at the transmitting end. It is to be noted that the loop transmitting system shown in Fig. 2 may replace the equivalent loop transmitting system shown in Fig. 1 at the junctions EF. The normal battery $e$ is shown as $e7$ and $e8$ and is connected to the fixed contacts of a changeover assembly $a$ via line feed resistances $r1$ and $r6$ and current limiting resistances $r5$ and $r2$. The moving contact is connected to earth via a normally made contact $b2$. Resistances $r1$ and $r6$ are shunted by rectifiers MR1 and MR2.

Figure 4:
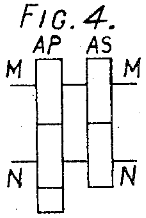
Fig. 4 shows an arrangement of loop current receiving equipment of the relay type.

At the other end of the transmission line at the junctions MN of Fig. 1, two relays shown in Fig. 4 may be used at the receiving end to replace the equivalent circuit shown in Fig. 1. Fig. 4 shows typical means for connecting the reception apparatus operated solely by loop currents. The conventional relays shown, consisting of two equal windings connected one in lead M and one in lead N and with the winding polarities such that no flux is produced by earth currents. Relay AS is of the non-polarized type, responding to current magnitude independent of polarity. Relay AP is of the polarized type operating upon reversal of currents. If both forms of relays are used at the receiving end, then one signal may consist of reversal of loop current, such as caused by contact $a$ of Fig. 2, and another form may consist of cessation of loop current such as caused by contact $b1$ of Fig. 2. In this arrangement there is no interference from earth currents, provided relay AP is predisposed to operate or release upon cessation of loop current. Relays AP and AS may be connected in a manner well-known in the art.

In more detail, the change-over of contact $a$ reverses the polarity of the lines and maintains a balance in the respective circuits by inserting alternatively the resistors $r5$ and $r6$ in one instance and resistors $r2$ and $r1$ in other instances. With contact $a$ in the position as shown in Fig. 2, shunts out the battery $e7$ and the resistor $r5$ so that the polarity over the respective transmission lines are as follows: + polarity on the M conductor and a − polarity on the N conductor. Assuming that the polarized relay AP is operated when the M lead is + and the N lead is −, both relays AP and AS will operate over the following path: positive side of battery $e8$, contacts $b2$, contacts $a$ (as shown in Fig. 2), resistor $r1$, conductor E, conductor AC (Fig. 1), conductor M, upper winding of relay AP, upper winding relay AS, lower winding of relay AS, lower winding of relay AP, conductor N, conductor BD (Fig. 1), conductor F, rectifier MR2, resistor $r2$, and the negative side of battery $e8$.

To reverse the polarity of the conductors M and N, the contact $a$ makes with the alternative contact. Thereupon, conductor M is negative and conductor N is positive, since the battery $e8$ and resistor $r2$ is now shunted by the make contact $a$. Under the present condition relay AP will not operate, but relay AS will operate over the following path: positive side of battery E7, contact $b2$, make contact $a$, resistor $r6$, conductor F, conductor BD, conductor N, lower winding of relay AP, lower winding of relay AS, upper winding of relay AS, upper winding of relay AP, conductor M, conductor AC, rectifier MR1, resistor $r5$, and the negative side of battery $e7$.

The contacts $b1$ and $b2$ have been shown in Fig. 2 to illustrate how single current loop operations of the receiving apparatus may be obtained, without causing interference to earth responsive apparatus. Closure of contacts $b1$ leave the receiving apparatus to respond to its own loop battery if connected as indicated in Fig. 1, while opening of contacts $b2$ increases the earth current. It is to be noted that on the receiving end a loop battery as indicated in Fig. 1, is connected thereto.

Figure 3:
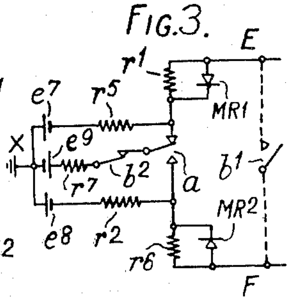

Referring now to Fig. 3, which is a modification of Fig. 2. The battery $e$ of Fig. 3 has been split into two parts, which $e7$ and $e8$ form one part and $e9$ forms the other part. The junctions of the two parts are earthed. An additional resistance $r7$ has been added between the contacts $b2$ and the positive side of the battery $e9$. By suitably arranging the ratios of $e9$ to $e7+e8$ and the resistances $r1$, $r2$, $r5$, $r6$, $r7$, a balance for the earth current is maintained at either position of the contact $a$, and further no change of earth current is present during the transit time. In this manner, the transit time interference likely to produce cross talk can be eliminated without altering the other advantages of Fig. 2.

Figure 5:
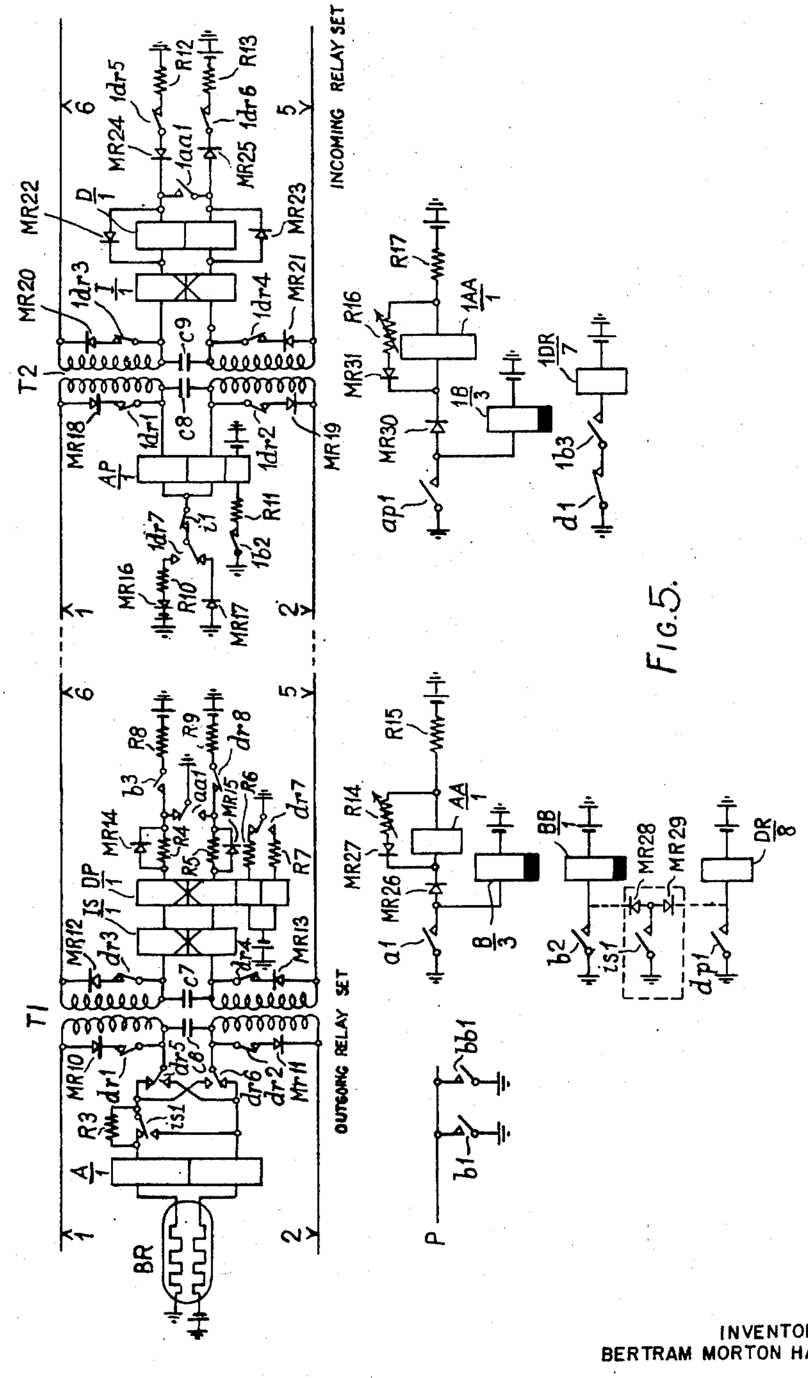
Fig. 5 shows the invention applied to outgoing and incoming relay sets at each end of a direct current conducting transmission line for use in an automatic telephone system.

Referring now to the outgoing relay set of Fig. 5, the connections to the incoming lines are made at points 1 and 2, and it is assumed that these points are looped either by a contact, as from a subscriber's instrument, or by a contact and apparatus such as is normally used for direct current signalling within an exchange, or from an exchange over junctions, via group selectors, or by a contact and apparatus, such as shown connected between points 5 and 6 of the incoming relay set shown in Fig. 5, via a group of selectors. The speech transmission bridge comprising transformers T1, condensers $c6$, $c7$, rectifiers MR10 to MR13 and contacts $dr1$ to $dr4$, is of the well-known form designated to prevent transmission of longitudinal signalling surges by means of transformer T1 and to prevent transverse surges by means of the rectifiers, the latter being effective only during the dialling and prior to the receipt of the answer signal so that speech transmission is unimpaired.

The A relay, which responds to a loop on the incoming lines and to dialling, is preferably of a type having low distortion, but not necessarily low time constant. The current in this loop is obtained from the normal exchange battery via a barretter BR. The contacts $dr5$, $dr6$, complete the circuit for the answer signal in a normal manner, while the contacts $Is1$ completes the circuit for the normal busy flash signal. The resistance R3 is used to hold relay A during the transit period, or during the operation of $Is1$ if there is no earth connection on the prior line apparatus.

Both the IS and DP relays have line windings equally disposed between the outgoing lines and interconnected so as to respond only to earth currents. Relay IS is a non-polarized differential relay, which is normally operated, designed so as not to respond to reversals of current from the incoming relay set. Relay DP is a polarized differential relay responding to reversals of earth current from the incoming relay set. Relay DP is a polarized relay responding to reversal of earth current from the incoming relay set, and having two small-turn additional windings, by means of which the relay tends to remain in its operated position until the flux is reduced to zero. The biasing fluxes for this purpose are obtained from battery via resistance R6 or R7, according to the position of contact $dr7$. Relay DR is a slave relay of relay DP.

The re-transmission of seizure, dialling and release signals is performed on a double current basis from the normal exchange battery by means of a single changeover contact $aa1$ in association with resistance R8, R9, and via line balancing resistances R5, R5, shunted by rectifiers MR14 and MR15, as described for Fig. 2. Relay AA is a high speed slave relay of A, and is arranged so that with the aid of rectifier MR27 and variable resistance R14, it can be adjusted to pass on the impulse time transmitted to A. The rectifier MR26 prevents the back E. M. F. from other relays operated from A1 make from affecting the response of AA, while R15 is designed to give the lowest possible time constant of relay AA. Relay B is a slow-to-release relay. Contact $b1$ grounds the P lead to hold the preceding switches. Relay $b2$ operates a slow-to-release relay BB to provide additional grounding of the P lead so that sufficient time is given for the incoming relay set and the associated group selector to restore to normal.

Where a manual hold signal is required, busy flash is not required. Hence, the response of relay IS to the same electrical signal from the incoming relay set can be used for manual hold. By taking the contact IS1 from the incoming line and transferring it to the relay set as shown in the dotted area between relays BB and DR, receipt of the signal will cause both relays BB and DR to be held, regardless of the release of relays A, B and DP. The subscriber can thus be held and so can the line reversal signal given by $dr5$, $dr6$, which is needed by a previous discriminator circuit. The subscriber can always recall the operator independent of any other circuit function. Rectifiers MR28 and MR29 permit IS to hold relays BB and DR without providing any interconnection for normal operation of these relays.

Referring now to the incoming relay set of Fig. 5, the purpose of many of the components, and, in fact, much of the circuit is similar to that in the outgoing set and therefore will not be described.

The incoming line relay AP is of the polarized type and is equally disposed between the lines to be responsive only to loop currents. Its center point is connected via the earth signalling contacts and batteries to earth. Relay I, a differential relay, operates contacts $i1$ to transmit a busy flash signal. Relay DR operates the contacts $1dr7$ to transmit an answer signal. Relay R10 is a protective resistance for the contact $1dr7$. The rectifiers MR16, MR17 prevent the earth current from reversing in either position of contacts $1dr7$ to prevent false reversal of relay DP by earth potential differences exceeding $e/2$ or when $i1$ is operated. The tertiary small turn winding on AP enables contact $1b2$ to pass a biasing flux through the relay via R11 and battery, to insure that the relay attains its unoperated position should the loop current release at any time.

The outgoing side of the incoming relay set has been shown as using the well-known single counter E. M. F. method for signalling. This method enables working into the standard exchange equipment, since it uses the exchange battery for the loop current; the reversal of battery for the answer signal; negative battery to both lines for the busy flash signal or the manual hold from an operator's position to operate relay I.

Rectifiers MR22, MR23 are necessary for release of relay D on reversal of the loop battery with single current working and also permits D to be held on half its normal current when busy flash is received, and act as a short circuit on the relay when 1aa1 releases, thus giving relay D a slow-to-release lag. This avoids the possibility of relay D impulsing with the 1aa1 contact. Rectifiers MR24 and MR25 are incorporated so that when working into an A relay of high inductance the back E. M. F. of the relay on release of 1aa1 will not pass a reversal of current into the battery. Contacts 1dr5, 1dr6, relieve the battery of the current drain due to the current limiting resistors R12 and R13 during speech and ensure the release of the A relay should the calling end release first.

In more detail, the A relay is seized by a preceding switch train over the following path: ground, barretter BR, upper winding of relay A, contacts is1, contacts dr5, upper primary winding of transformer T1, conductor 1, through the loop circuit of the incoming line, conductor 2, lower primary winding of transformer T1, contacts dr6, lower winding of relay A, barretter BR and battery.

Relay A operates and contacts a1 close to operate relay AA and relay B. Relay AA operates over the following path: battery, resistance R15, relay AA, rectifier MR26, contacts a1 to ground. Relay B operates over the following path: ground, contacts a1, relay B and battery.

Relay AA operates and contacts aa1 prepares a loop circuit.

Relay B operates and contacts b1 make to ground the preceding switch train at the lead P. Contacts b2 make to operate the BB relay over the following path: ground, contacts b2, relay BB and battery. Contacts bb1 make to further ground the P lead. Contacts b3 make to complete the loop circuit to relay AP.

The normal operating paths for the upper windings of relays AP, IS and DP are the same and this circuit is as follows: ground, rectifier MR17, contacts 1dr7, contacts i1, upper winding of relay AP, upper primary winding of T2, conductor 11, conductor 6, upper secondary winding of T1, upper winding of relay IS, upper winding of relay DP, rectifier MR14, break contacts aa1 and ground. The circuit just described is not effective for energizing any of the upper windings, since there is no potential difference present.

The normal operating paths for the lower windings of relays AD, IS and DP are the same, and this circuit is as follows: ground, rectifier MR17, break contacts 1dr7, contracts i1, lower winding of relay AP, contacts 1d22, rectifier MR19, conductors 2—5, rectifier MR13, contacts dr4, lower winding of relay IS, lower winding of relay DP, rectifier MR15, contacts dr8, resistor R9 and battery. The relays AP and DP are polarized relays and the polarity of the current flow through their respective lower windings are not effective to operate the relays. However, the relay IS, a differential non-polarized relay, is a normally operated relay and the current flow through the lower winding is sufficient to operate the same. The contacts is1, as shown in Fig. 5, are in the normally operated position.

With the relays B and AA operated, contacts b3 and aa1 make to energize the upper windings of the relays AP, IS and DP and this circuit is as follows: ground, rectifier MR17, break contacts 1dr7, contacts i1, upper winding of relay AP, upper primary winding of T2, conductor 1, conductor 6, upper secondary winding of T1, upper winding of relay IS, upper winding of relay DP, rectifier MR14, contacts b3, R8 and battery.

As contacts aa1 ground the resistor 9 and the battery attached thereto, there is no potential difference to energize the lower windings of relays AP, IS and DP and the circuit traced showing this is as follows: ground, contacts aa1, lower winding of relay DP, lower winding of relay IS, lower secondary winding of T1, conductor 5, conductor 2, lower primary winding of T2, contacts i1, contacts 1dr7, rectifier MR17, and ground.

The make contacts aa1 reversed the polarity of the current flow through the upper winding of relay AP to operate the same. The current flow through the upper winding of relay IS is sufficient to maintain the same operated. Relay DP is not operated, since the polarity of the current flow through its upper winding is not effective to operate the same.

Relay AP operates and contacts ap1 close to operate relays 1AA and 1B. Relay 1AA operates over the following path: battery, R17, relay 1AA, rectifier MR30, contacts ap1, and ground.

It is to be noted that the succeeding switch is similar to the system shown in Fig. 5. That is, the succeeding switch has a line relay similar to relay A of the outgoing relay set.

The normal operating paths for the upper windings of relays D and I are the same, and this circuit is as follows: ground on conductor 6, upper secondary winding of T2, upper winding of relay I, upper winding of relay D, rectifier MR24, contacts 1dr5, resistor R12 and ground. There is no potential difference over this circuit and so the upper windings are not energized.

The normal operating paths for the lower windings of relays D and I are the same, and this circuit is as follows: battery on conductor 5, lower secondary winding of T2, lower winding of relay I, lower winding of relay D, rectifier MR25, contacts 1dr7, resistor R13 and battery. There is no potential difference over this circuit and so the lower windings are not energized.

Relay 1AA operated to close the contacts 1aa1 to thereby operate relay D. After closure of contacts 1aa1 current flows through the lower windings of relay D and I over the following path: ground, resistor R12, contacts 1dr5, rectifier MR24, contacts 1aa1, lower winding of relay D, lower winding of relay I, lower secondary winding of T2, and battery on conductor 5. The upper windings of relays D and I are energized over the following path: ground on conductor 6, upper secondary winding of T2, upper winding of relay I, upper winding of relay D, contacts 1aa1, rectifier MR25, contacts 1dr6, resistor R13 and battery.

The current flow through both windings of relay D in the direction described operates the polarized relay. However, relay I, a differential relay, does not operate, because both windings are energized differentially.

At the same time relay D operates, or a very short time thereafter, the relay 1B operates over the following path: battery, relay 1B, contacts ap1 and ground.

Relay D operates and contacts d1 break to prevent the relay 1DR from operating. Relay 1B operates and contacts 1b2 open the circuit to the tertiary winding of relay AP and contacts 1b3 close to prepare a circuit to operate the relay 1DR.

As the contacts 1aa1 close to operate relay D, the succeeding switch is seized and the calling party proceeds to operate a dialling mechanism, not shown, to transmit dial pulses over the conductors 1 and 2 of the outgoing relay set. Relay A is interrupted by the dial pulses and contacts a1 thereby interrupt the operation of relay AA. Relay AA, in turn, retransmits dial pulses to the incoming relay set through the contents aa1. In response to the operation of the contacts aa1, the relay AP is interrupted over a path previously described for operating the same. Relay AP thereby intermittently interrupts the operation of the relay 1AA, which repeats the pulses to the succeeding switch train through the contacts 1aa1. The A relay of the succeeding switch is interrupted in response to the pulses transmitted through the contacts aa1 over a path described for the operation of relay D. Relay D remains operated during the dialing period.

If the succeeding switch train is idle, the connection is completed to the called party and when the called party answers, a reversal of battery over the conductors 5 and 6 releases the polarized relay D. The answer relay in the succeeding switch train will cause the reversal of battery in the well-known manner. The rectifier MR22 will short out the upper winding of relay D and the current flow through the upper winding of relay I is as follows: ground, resistor R12, contacts 1dr5, rectifier MR24, rectifier MR22, upper winding of relay I, contacts 1dr3, rectifier MR20, conductor a and battery. The rectifier MR23 will short out the lower winding of relay D and the current flow through the lower winding of relay I is as follows: ground on conductor 5, rectifier MR21, contacts 1dr4, lower winding of relay I, rectifier MR23, rectifier MR25, contacts 1dr6, resistor R13 and battery. Relay I does not operate since both windings are energized differentially. The only other path of current flow, aside from those just mentioned, is through the ground on resistor R12, contacts 1dr5, rectifier MR24, contacts 1aa1, rectifier MR25, contacts 1dr6 and battery on resistor R13. The path just traced has no effect on the operation of the relays. Since no current now flows in either winding of relay D, due to the rectifiers MR22 and MR23, the relay D releases.

In response to the release of relay D, the relay 1DR operates over the following path: battery, relay 1DR, contacts 1b3, contacts d1 and ground. Relay 1DR operates and contacts 1dr1, 1dr2, 1dr3 and 1dr4 open to prepare a talking circuit through the transformer T2. Contacts 1dr5 and 1dr6 break to ensure release of the A relay of the succeeding switch should the calling line release first. Contacts 1dr7 make to operate the relay DP of the outgoing relay set over the following path: Ground, contacts aa1, R5, lower winding of relay DP, lower winding of relay IS, lower secondary winding of T1, conductor 5, conductor 2, lower primary winding of T1, lower winding of AP, contacts i1, contacts 1dr7, r10, rectifier MR16 and battery. The make contact 1dr7 reverses the polarity to the polarized relay DP to operate the same.

There is no current flow through the upper windings of relays DP, IS and AP, which is apparent from the tracing of the following path: battery, rectifier MR16, make contacts 1dr7, contacts i1, upper winding of relay AP, contacts 1dr1, rectifier MR18, conductor 1, conductor 6, rectifier MR12, contacts dr3, upper winding of relay IS, upper winding of relay DP, resistor R4, contacts b3, resistor R8 and battery. The lower windings of relays DP, IS and AP are energized over the following circuit: ground, make contacts aa1, resistor R5, lower winding of relay DP, lower winding of relay IS, lower secondary winding of T1, conductor 5, conductor 2, lower primary winding of T2, lower winding of relay AP, contacts i1, make contacts 1dr7, resistor R10, rectifier MR15 and battery.

The polarity of the current flow through the lower winding of relay DP is effective to operate the same. The differential relay IS is maintained operated by the energization of its lower winding. Relay AP is maintained operated by the current flow through its lower winding, whcih is of the operating polarity.

Relay DP operates, and contacts dr1 make to operate relay DR over an obvious path. Relay DR operates and contacts dr5 and dr6 reverse the battery to the preceding switch to establish an answer signal to the preceding switch train. Contacts dr1, dr2, dr3 and dr4 break to prepare a talking circuit through the transformer T1. Contacts dr7 complete a circuit to the auxiliary winding of relay DP. Contacts dr8 remove the current drain of R9 from the exchange battery during speech.

If the succeeding switch or called party is busy, a flash busy signal from the succeeding switch train places battery on both conductors 5 and 6 to operate relay I. When busy flash (battery potential) is connected to both conductors 5 and 6 the lower winding of relay I energized over the following path: ground, resistor R12, contacts 1dr5, rectifier MR24, contacts 1aa1, lower winding of relay D, lower winding of relay I, lower secondary winding of T2, and battery on conductor 5. The upper winding of relay I is energized over the following path: ground resistor R12, contacts 1dr5, rectifier MR24, rectifier MR22, upper winding of relay I, contacts 1dr3, rectifier MR20, and battery on conductor 6. The current flow through both windings of relay I operated the relay, since the current passes through in an aiding direction. Relay D is maintained operated, since the current flow through its lower winding is of the operating polarity.

Relay I operates and contacts i1 break to release the relay IS. With the contacts i1 open, the operating path through the windings of the relays AP, DP and IS is as follows: ground, make contacts aa1, resistor R5, lower winding of relay DP, lower winding of relay IS, lower secondary winding of T1, conductor 5, conductor 2, lower primary winding of T2, lower winding of relay AP, upper winding of relay AP, upper primary winding of T2, conductor 1, conductor 6, upper secondary winding of T1, upper winding of relay IS, upper winding of relay DP, rectifier MR14, contacts b3, resistor R8, and battery.

Relay IS releases, since both windings are energized differentially. Relay OP, a differential and polarized relay, is not operated, because both windings are energized differentially. Relay AP is maintained operated by the current flow of operating polarity through both windings. Relay IS released and contacts is1 make to transmit a busy signal to the preceding switch train.

When the calling party releases his line to release the preceding switch train, relay A releases over a path previously described for operating the same. Contacts a1 break to release the relays AA and B over a path previously described for operating the same.

Contacts $b2$ break to release the relay BB and contacts $aa1$ restore to normal position to release relay AP over a path previously described. Contacts $ap1$ break to release relays 1AA and 1B. Contacts $1aa1$ break to release relay D and relay I. Contacts $i1$ make to operate relay IS. The system is now prepared for future operation.

In regard to the releasing of the whole link, it is arranged that the private wire continuity through the associated group selector is broken so that the earth from the incoming relay set only holds this selector; so it is only necessary to retain the guarding earth on the outgoing relay set for a period sufficiently longer than that required to release the incoming relay set and its selector, to obtain the individual releasing of all links in a tandem set-up. It is necessary to have a slow-to-release earth on the incoming relay private wire in order to meet the condition of answer before completion of dialling. However, as long as an additional period of guarding is given to the outgoing private wire, the total release time of any number of links of the present form is no more than one of them, and probably less than heretofore obtained. In fact, the time at which any subsequent or previous link releases is of no significance, nor is the manner in which other links release significant, provided only that the release is initiated in all cases by release of the A line relays by the calling end.

While a particular embodiment of the invention has been described, it will be understood that various modifications may be made therein which are within the true spirit and scope of the invention.

I claim:

1. In a signalling system, a two conductor trunk, a loop circuit including the conductors of said trunk, a source of current in said loop circuit having an earthed connection, means at one end of said trunk for transmitting signals over said loop circuit by reversing the flow of current therein while maintaining a connection from the conductors to said earthed connection, a relay at the far end of said trunk operated responsive to said signals, an earthed connection to the midpoint of said relay, and means for controlling said earthed connection to said relay to transmit signals over the trunk via a circuit including the earthed connection at said one end of the trunk.

2. In a signalling system, a source of current, two line conductors, a limiting resistor and a balancing resistor connected in series between each of said conductors and a particular pole of said source, a current rectifier in shunt with each balancing resistor, means for connecting said source alternately in shunt of each of said limiting resistors to thereby change the direction of current flow in said conductors, each of said rectifiers becoming conductive alternately as determined by the direction of current flow in said conductors to maintain the resistance from each of said conductors to said source equal regardless of which limiting resistance is shunted by said source.

3. In a signalling system, a loop circuit having two conductors terminating at the far end in a device responsive to reversals of loop current, an earth circuit including said conductors and an earthed terminal at each end of said loop, a source of current having one pole earthed, a limiting resistor and a balancing circuit connected in series between each of said conductors and the other pole of said source, another source of current, a circuit including a third resistor and said other source of current connected in series, means for connecting said last circuit alternately between the earthed terminal and each of said balancing circuits to reverse the polarity of said conductors, the component parts of said circuits of such electrical values that the earth current is not changed by the operation of said means.

4. A signalling system for signalling in both directions over a two conductor trunk, a first means at one end of said trunk for transmitting loop current reversals over both conductors of said trunk, a second means at the other end of said trunk for transmitting earth current interruptions over both conductors of said trunk, a third means at said other end of said trunk for transmitting earth current reversals over both conductors of said trunk, receiving equipment of two types at said one end of said trunk, one type operated only in response to earth current interruptions by said second means, the other type operated only in response to earth current reversals by said third means, and receiving equipment at said other end of said trunk operated only in response to loop current reversals by said first means.

5. A signalling system as claimed in claim 4 and including a circuit serially connecting said receiving equipment of said two types at said one end of said trunk.

6. A signalling system for signalling in both directions over a two conductor trunk, a first means at one end of said trunk for transmitting loop current reversals over both conductors of said trunk, a second means at the other end of said trunk for transmitting earth current interruptions over both conductors of said trunk, a third means at said other end of said trunk for transmitting earth current reversals over both conductors of said trunk, a polarized relay at said one end of said trunk, means connecting said polarized relay to both conductors whereby said polarized relay is operated only in response to earth current reversals by said third means, a differential relay at said one end of said trunk, means connecting said differential relay to both conductors whereby said differential relay is operated only in response to earth current interruptions by said second means, a polarized relay at said other end of said trunk, and means connecting said last-mentioned polarized relay to both conductors in another manner whereby said last-mentioned polarized relay is operated only in response to loop current reversals by said first means.

7. A signalling system for signalling over a two conductor trunk, a source of current, a first limiting resistor and a first balancing resistor connecting one conductor at one end of said trunk to a particular pole of said source; a second limiting resistor and a second balancing resistor connecting another conductor at one end of said trunk to a particular pole of said source, means for connecting said source alternately in shunt with each of said limiting resistors to thereby change the direction of current flow in said conductors, a current rectifier in shunt with each of said balancing resistors and becoming conductive alternately as determined by the direction of current flow in said conductors to maintain the resistance from each of said conductors to said source equal regardless of which limiting resistor is shunted by said source, and a receiving unit at the other end of said trunk operated in response to the current reversals by said means.

8. A signalling system for signalling in both directions over a two conductor trunk, a source of current, a first limiting resistor connecting one conductor at one end of said trunk to a particular pole of said source, a second limiting resistor connecting another conductor at one end of said trunk to a particular pole of said source, a first transmitting means for connecting said source alternately in shunt with each of said limiting resistors to thereby change the direction of current flow in said conductors, a second transmitting means at the other end of said trunk for transmitting earth current interruptions over both conductors of said trunk, a third transmitting means at said other end of said trunk for transmitting earth current reversals over both conductors of said trunk, receiving equipment of two types at said one end of said trunk, one type operated only in response to earth current interruptions by said second means, the other type operated only in response to earth current reversals by said third means, and receiving equipment at said other end of said trunk operated only in response to current reversals by said first means.

9. A signalling system for signalling in both directions over a two conductor trunk, a source of current, a first limiting resistor and a first balancing resistor connecting one conductor at one end of said trunk to a particular pole of said source, a second limiting resistor and a second balancing resistor connecting another conductor at one end of said trunk to a particular pole of said source, a first transmitting means for connecting said source alternately in shunt with each of said limiting resistors to thereby change the direction of current flow in said conductors, a current rectifier in shunt with each of said balancing resistors becoming conductive alternately as determined by the direction of current flow in said conductors to maintain the resistance from each of said conductors to said source equal regardless of which limiting resistance is shunted by said source, a second transmitting means at the other end of said trunk for transmitting earth current interruptions over both conductors of said trunk, a third transmitting means at said other end of said trunk for transmitting earth current reversals over both conductors of said trunk, receiving equipment of two types at said one end of said trunk, one type operated only in response to earth current interruptions by said second means, the other type operated only in response to earth current reversals by said third means, and receiving equipment at said other end of said trunk operated only in response to current reversals by said first means.

10. A signalling system for signalling in both directions over a two conductor trunk, a loop current circuit comprising said two conductors in series, an earth current circuit comprising said two conductors in parallel, a first means included within said loop current circuit at one end of said trunk for transmitting loop current reversals over both conductors of said trunk, a second means included within said earth current circuit at the other end of said trunk for transmitting earth current interruptions over both conductors of said trunk, a third means included within said earth current circuit at the other end of said trunk for transmitting earth current reversals over both conductors of said trunk, receiving equipment of two types included within said earth current circuit at said one end of said trunk, one type operated only in response to earth current interruptions by said second means, the other type operated only in response to earth current reversals by said third means, and receiving equipment included within said loop current circuit at said other end of said trunk operated only in response to loop current reversals by said first means.

BERTRAM MORTON HADFIELD.

REFERENCES CITED

The following references are of record in the file of this patent:

UNITED STATES PATENTS

| Number | Name | Date |
|---|---|---|
| Re. 12,739 | Ghegan | Jan. 14, 1908 |
| 1,037,927 | Kitsee | Sept. 10, 1912 |
| 1,664,468 | Strieby | Apr. 3, 1928 |
| 1,838,268 | Ladner | Dec. 29, 1931 |
| 1,843,137 | Lubberger et al. | Feb. 2, 1932 |
| 1,845,571 | Trechcinski | Feb. 16, 1932 |
| 2,038,199 | Ressler | Apr. 21, 1936 |
| 2,203,755 | Topfer | June 11, 1940 |
| 2,265,029 | Derr | Dec. 2, 1941 |
| 2,366,854 | Hadfield | Jan. 9, 1945 |
| 2,387,246 | Demonet et al. | Oct. 23, 1945 |
| 2,414,297 | Hadfield | Jan. 14, 1945 |